US008959185B2

(12) United States Patent
Nakil et al.

(10) Patent No.: US 8,959,185 B2
(45) Date of Patent: Feb. 17, 2015

(54) MULTITENANT SERVER FOR VIRTUAL NETWORKS WITHIN DATACENTER

(71) Applicants: Harshad Bhaskar Nakil, San Jose, CA (US); Pedro R. Marques, Sunnyvale, CA (US); Hampapur Ajay, Sunnyvale, CA (US); Ashish Ranjan, San Ramon, CA (US); Ankur Singla, Belmont, CA (US)

(72) Inventors: Harshad Bhaskar Nakil, San Jose, CA (US); Pedro R. Marques, Sunnyvale, CA (US); Hampapur Ajay, Sunnyvale, CA (US); Ashish Ranjan, San Ramon, CA (US); Ankur Singla, Belmont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 218 days.

(21) Appl. No.: 13/835,017

(22) Filed: Mar. 15, 2013

(65) Prior Publication Data

US 2013/0332577 A1     Dec. 12, 2013

Related U.S. Application Data

(60) Provisional application No. 61/723,685, filed on Nov. 7, 2012, provisional application No. 61/722,696, filed on Nov. 5, 2012, provisional application No. 61/721,979, filed on Nov. 2, 2012, provisional (Continued)

(51) Int. Cl.
    *G06F 15/16*     (2006.01)
    *H04L 12/24*     (2006.01)

(Continued)

(52) U.S. Cl.
    CPC ............ *H04L 41/0668* (2013.01); *H04L 49/70* (2013.01); *H04L 41/12* (2013.01); *H04L 45/02* (2013.01); *H04L 67/32* (2013.01); *H04L 41/0659* (2013.01)
    USPC ............ 709/219; 709/221; 370/351; 370/360

(58) Field of Classification Search
    CPC ..... H04L 49/70; H04L 67/1002; H04L 45/24; H04L 41/065; H04L 67/32
    USPC .......... 709/200–203, 217–227; 370/351, 360, 370/409
    See application file for complete search history.

(56) References Cited

U.S. PATENT DOCUMENTS

| | | |
|---|---|---|
| 6,760,328 B1 | 7/2004 | Ofek |
| 6,985,490 B2 * | 1/2006 | Czeiger et al. ................ 370/401 |

(Continued)

OTHER PUBLICATIONS

Invitation to Pay Additional Fees from International Application No. PCT/US2013/044378, dated Sep. 18, 2013, 5 pp.

(Continued)

*Primary Examiner* — Moustafa M Meky
(74) *Attorney, Agent, or Firm* — Shumaker & Sieffert, P.A.

(57) ABSTRACT

In general, techniques are described for facilitating multi-tenancy of a server accessed by virtual networks of a data center. A device included within a data center comprising one or more processors may perform the techniques. The processors may be configured to execute a virtual switch that supports a number of virtual networks executing within the data center. The virtual switch may be configured to receive a request regarding data associated with an identifier that is unique within one of the virtual networks that originated the request. The virtual switch may then translate the identifier included within the request to generate a globally unique identifier that is unique within the plurality of virtual networks, update the request to replace the identifier included within the request with the globally unique identifier, and transmit the updated request to a server of the data center.

20 Claims, 7 Drawing Sheets

Related U.S. Application Data application No. 61/721,994, filed on Nov. 2, 2012, provisional application No. 61/718,633, filed on Oct. 25, 2012, provisional application No. 61/656,468, filed on Jun. 6, 2012, provisional application No. 61/656,469, filed on Jun. 6, 2012, provisional application No. 61/656,471, filed on Jun. 6, 2012.

(51) Int. Cl.
    *H04L 12/931*    (2013.01)
    *H04L 12/751*    (2013.01)
    *H04L 29/08*     (2006.01)

(56) References Cited

U.S. PATENT DOCUMENTS

| | | | |
|---|---|---|---|
| 7,042,838 B1 | 5/2006 | Shand et al. | |
| 7,178,059 B2 * | 2/2007 | Greenspan et al. | 714/13 |
| 7,184,437 B1 | 2/2007 | Cole et al. | |
| 7,519,006 B1 | 4/2009 | Wing | |
| 7,937,492 B1 | 5/2011 | Kompella et al. | |
| 7,965,699 B1 * | 6/2011 | Accardi et al. | 370/351 |
| 8,027,354 B1 * | 9/2011 | Portolani et al. | 370/431 |
| 8,699,499 B2 * | 4/2014 | Mulligan et al. | 370/395.53 |
| 8,909,602 B2 * | 12/2014 | Soundararajan et al. | 707/639 |
| 2007/0195797 A1 | 8/2007 | Patel et al. | |
| 2010/0061242 A1 | 3/2010 | Sindhu et al. | |
| 2013/0074066 A1 * | 3/2013 | Sanzgiri et al. | 718/1 |
| 2013/0163606 A1 * | 6/2013 | Bagepalli et al. | 370/409 |
| 2013/0232492 A1 * | 9/2013 | Wang | 718/1 |
| 2013/0329571 A1 * | 12/2013 | Shimokawa et al. | 370/244 |

OTHER PUBLICATIONS

Notification of Transmittal of the International Search Report from International Application No. PCT/US2013/044378, dated Nov. 7, 2013, 16 pp.

Cloud Computing and Security—A Natural Match, Trusted Computing Group, Apr. 2010, 5 pp.

Trusted Multi-Tenant Infrastructure Work Group FAQ, Trusted Computing Group, Sep. 2010, 2 pp.

TCG Trusted Network Connect, TNC IF-MAP Binding for SOAP, Specification version 2.1, Revision 15, May 7, 2012, 81 pp.

* cited by examiner

MULTITENANT SERVER FOR VIRTUAL NETWORKS WITHIN DATACENTER

PRIORITY CLAIM

This application claims the benefit of U.S. Provisional Application No. 61/723,685, filed Nov. 7, 2012; U.S. Provisional Application No. 61/722,696, filed Nov. 5, 2012; U.S. Provisional Application No. 61/721,979, filed Nov. 2, 2012; U.S. Provisional Application No. 61/721,994, filed Nov. 2, 2012; U.S. Provisional Application No. 61/718,633, filed Oct. 25, 2012; U.S. Provisional Application No. 61/656,468, filed Jun. 6, 2012; U.S. Provisional Application No. 61/656,469, filed Jun. 6, 2012; and U.S. Provisional Application No. 61/656,471, filed Jun. 6, 2012, the entire content of each of which being incorporated herein by reference.

TECHNICAL FIELD

Techniques of this disclosure relate generally to computer networks, and more particularly to virtual networks.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

SUMMARY

In general, techniques are described to facilitate multi-tenancy in the context of a vendor-neutral server, such as an Interface for Metadata Access Point (IF-MAP) server. The various techniques described in this disclosure may provide for a multi-tenant IF-MAP server in the context of a number of virtual networks executing within a data center, where each of the virtual networks are associated with a different tenant and access the IF-MAP server to maintain session data. Virtual switches that support these virtual networks may ensure identifiers associated with the session data may be globally unique across the virtual networks so as to effectively maintain separate or non-overlapping virtual IF-MAP server spaces for each of the virtual networks. To ensure this separation, the virtual switches may translate identifiers in responses from the virtual networks from locally unique identifiers that are unique within the context of the virtual network to globally unique identifiers that are unique across all of the virtual networks. Typically, this translation involves appending a namespace to the identifier in the response to create a globally unique identifier in the form of "namespace:identifier." In this manner, the techniques may facilitate multi-tenancy within vendor-neutral databases.

In one embodiment, a method comprises receiving, with a virtual switch that supports a plurality of virtual networks executing within a data center, a request regarding data associated with an identifier that is unique within one of the plurality of virtual networks that originated the request, and translating the identifier included within the request to generate a globally unique identifier that is unique within the plurality of virtual networks. The method also comprises updating the request to replace the identifier included within the request with the globally unique identifier, and transmitting the updated request to a server of the data center.

In another embodiment, A device included within a data center comprises one or more processors configured to execute a virtual switch that supports a plurality of virtual networks executing within the data center. The virtual switch is configured to receive a request regarding data associated with an identifier that is unique within one of the plurality of virtual networks that originated the request, translate the identifier included within the request to generate a globally unique identifier that is unique within the plurality of virtual networks, update the request to replace the identifier included within the request with the globally unique identifier, and transmit the updated request to a server of the data center.

In another embodiment, a non-transitory computer readable storage medium has stored thereon instructions that, when executed, cause one or more processors of a device included within a data center to execute a virtual switch that supports a plurality of virtual networks executing within the data center. The virtual switch is configured to receive a request regarding data associated with an identifier that is unique within one of the plurality of virtual networks that originated the request, translate the identifier included within the request to generate a globally unique identifier that is unique within the plurality of virtual networks, update the request to replace the identifier included within the request with the globally unique identifier, and transmit the updated request to a server.

The details of one or more embodiments of the techniques are set forth in the accompanying drawings and the description below. Other features, objects, and advantages of the techniques will be apparent from the description and drawings, and from the claims.

DETAILED DESCRIPTION

Figure 1:
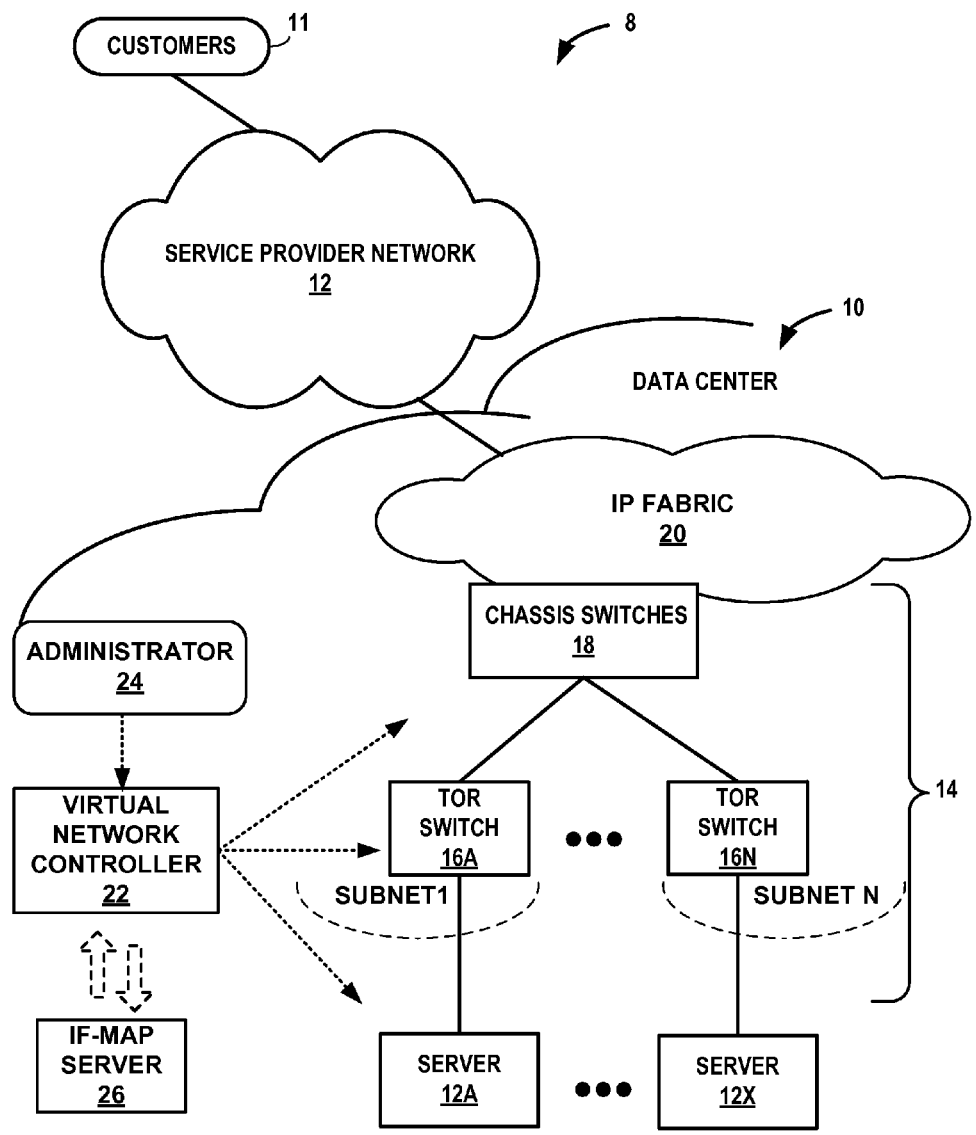
FIG. 1 is a block diagram illustrating an example data center in which examples of the techniques described herein may be implemented.

FIG. 1 is a block diagram illustrating an example network 8 having a data center 10 in which examples of the techniques described herein may be implemented. In general, data center 10 provides an operating environment for applications and services for customers 11 coupled to the data center by service provider network 12. Data center 5 may, for example, host infrastructure equipment, such as networking and storage systems, redundant power supplies, and environmental controls. Service provider network 12 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 may be a facility that provides network services for customers 11. Customers 28 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, data center 10 may be individual network servers, network peers, or otherwise.

In this example, data center 5 includes set of storage systems and application servers 12A-12X (herein, "servers 12") interconnected via high-speed switch fabric 14 provided by one or more tiers of physical network switches and routers. Switch fabric 14 is provided by a set of interconnected top-of-rack (TOR) switches 16A-16BN ("TOR switches" 16) coupled to a distribution layer of chassis switches 18. Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to IP fabric 20 and service provider network 12. Chassis switches 14 aggregates traffic flows and provides high-speed connectivity between TOR switches 16. TOR switches 4A and 4B may be network devices that provide layer 2 (MAC address) and/or layer 3 (IP address) routing and/or switching functionality. TOR switches 4 and chassis switches 14 may each include one or more processors and a memory, and that are capable of executing one or more software processes. Chassis switches 14 are coupled to IP fabric, which performs layer 3 routing to route network traffic between data center 10 and customers 11 using service provider network 12.

Virtual network controller 22 ("VNC") provides a logically centralized controller for facilitating operation of one or more virtual networks within data center 10 in accordance with one or more embodiments of this disclosure. In some examples, virtual network controller 22 may operate in response to configuration input received from network administrator 24.

Interface for Metadata Access Point (IF-MAP) server 26 ("IF-MAP server 26") may represent an intermediate network device that stores information in accordance with a vendor-neutral data model. "IF-MAP" originally referred to an authorization data model that provides a standardized authorization data model that vendors may adopt so as to reduce communication or interoperability issues that arise between vendor-specific or proprietary authorization data models. The group responsible for introducing IF-MAP, known as the Trusted Computing Group (TCG), is encouraging vendors to accept this new IF-MAP standard and vendors are releasing devices compliant with this standard.

The IF-MAP standard provides not only a vendor-neutral or cross-vendor data model but also provides an IF-MAP protocol by which to access the authorization information stored according to this standard, vendor-neutral authorization data model. The IF-MAP protocol supports various IF-MAP messages or communications by which to publish authorization information, search authorization information stored within the IF-MAP server, subscribe to authorization information stored within the IF-MAP server, and poll the IF-MAP server for authorization information to which a given device is subscribed. More information concerning the IF-MAP cross-vendor or vendor-neutral data model and protocol can be found in a specification entitled "TNC IF-MAP Binding for SOAP," Specification Version 2.1, Revision 15, dated May 7, 2012, the contents of which are hereby incorporated by reference as if set forth in its entirety.

IF-MAP has since been expanded or modified to accommodate different technologies, including cloud computing (which may involve data centers, such as data center 10, that host cloud computing applications). IF-MAP server 26 may represent an IF-MAP server that implements a data model that conforms to IF-MAP in this cloud computing context and that supports the IF-MAP protocol for publishing, polling, accessing and/or receiving data stored to this cloud computing version of the IF-MAP data model.

While described herein with respect to this particular vendor-neutral authorization data model set forth by the IF-MAP standard, the techniques may be implemented with respect to any standard or accepted authorization data model. Moreover, while described as a separate device, e.g., a standalone database, IF-MAP server 22 may be integrated within any one of the network devices shown as residing within data center 10 in FIG. 1. For example, virtual network controller 22 may include an integrated IF-MAP server 26. The techniques of this disclosure therefore should not be limited to the example of FIG. 1 in this respect.

A virtual network may be used with multi-tenancy. The term "multi-tenancy" may refer to a system in which a single hardware and software platform simultaneously supports multiple tenants (e.g., customers, clients) from a common data store. The shared platform in the multi-tenant architecture is usually designed to virtually partition data and operations so that each tenant works with a unique virtual application instance. In one implementation, each subnet shown in FIG. 1 may serve one tenant, for example one company. In some examples, a first virtual network would belong to CompanyA, a second virtual network would belong to CompanyB, etc.

IF-MAP server 26 may not however support multi-tenancy when identifiers from different companies overlap. To illustrate by way of example, both CompanyA and CompanyB may have an employee identified as "Employee #5," where this identifier may be used to retrieve authorization or other information concerning "Employee #5." IF-MAP server 26 may not be able to resolve to which of CompanyA and CompanyB the request for information concerning "Employee #5" is to be returned. In this sense, IF-MAP server 26 may be unable to maintain different records for "Employee #5" at CompanyA and "Employee #5" at CompanyB, which may result in a single record used for both of Employee #5 at CompanyA and CompanyB. Mingling of information across CompanyA and CompanyB in this manner may represent a substantial breach of security, especially given that IF-MAP server 26 may store authorization information that may result in Employee #5 receiving authorization to access data for a CompanyA at which Employee #5 may not work.

In accordance with various aspects of the techniques described in this disclosure, one or more of servers 12 may translate what may be referred to as "locally unique" identifiers into globally unique identifiers that are unique within the context of data center 10. In other words, servers 12 may translate identifiers used for accessing data stored to IF-MAP server 26 that are locally unique within the context of the company into identifiers that are unique across all of the companies accessing data center 10, thereby potentially ensuring that data stored to IF-MAP server 26 remains secure in the sense that the data is only accessibly by the particular CompanyA and not by another company or customer of data center 10.

In operation, server 12A may, as one example, receive a request regarding data associated with an identifier that is unique within one of a number of customers of data center 10 (where, as described in more detail below, each customer as is often represented within data center 10 by a corresponding one of a number of virtual networks) that originated the request. In the example of FIG. 1, the request conforms to the vendor-neutral IF-MAP protocol, but the techniques may be performed with respect to any vendor-neutral or vendor specific protocol.

Server 12A may then translate the identifier (e.g., Employee #5) included within the request to generate a globally unique identifier that is unique within the plurality of virtual networks. Typically, this translation is transparent to the customer, which is another way of saying that the customer, CompanyA in this example, is not aware of this translation given that the identifier is locally unique within the context of CompanyA. That is, server 12A may translate the identifier in such a way that users and devices of CompanyA are not be able to detect that the translation occurred.

Typically, server 12A may store an association between each customer (or its virtual network representation of the customer) and a namespace. As one example, the namespace may comprise the name of the customer (e.g., CompanyA). Server 12A may then append this namespace to the identifier to generate the globally unique identifier. To illustrate, server 12A may receive a request from CompanyA having an identifier, Employee #5. Server 12A may translate identifier Employee #5 to a globally unique identifier by appending CompanyA to Employee #5 with the resulting globally unique identifier of "CompanyA:Employee #5." Appending namespaces in this manner is similar to how namespaces are employed in various computer programming languages, such as C++.

In any event, after generating the globally unique identifier, server 12A may update the request to replace the identifier included within the request with the globally unique identifier. Server 12A may then transmit the updated request to IF-MAP server 26. This request may comprise any form of communication including data publish requests, data polling requests, data retrieval requests or any other form of IF-MAP request or communication. The term "request" should therefore not be restricted in this sense to a request for data, but may refer to any request or communication.

IF-MAP server 26 may issue a response to the request, where the response may include the globally unique identifier. Given that the customer, CompanyA in this example, is often not aware of the translation performed by server 12A, server 12A may translate this globally unique identifier to recover the original identifier, which again is locally unique within the context of CompanyA. Server 12A may then update the response to replace the globally unique identifier with the recovered locally unique identifier. Server 12A may then transmit the updated response to CompanyA, which may process the response in any number of ways, but often in the context of authorizing the identifier to access data stored by or applications executed by one or more of servers 12.

While described above as using namespaces, the techniques may generally involve translation or transformation of the identifier from a locally unique identifier to a globally unique identifier. Using namespaces in the manner described above is merely one example of this translation and the techniques may be performed with respect to other forms of translation. For example, the translation may be performed using a mapping between customer/identifier combination and a globally unique identifier (which may be a number or index into the table). In other words, while namespaces are appended to the identifier to form the globally unique identifier, the techniques may be performed with respect to other forms of translation that do not reuse the locally unique identifier in the manner described above with respect to namespaces.

In this way, each tenant would be assigned its own namespace within its own subnet, such as "CompanyA" and "CompanyB." The tenants maintain identifiers that are unique in its respective context/subnet, but the identifiers may not be globally unique. For example, CompanyA may have an identifier "Employee#5" and CompanyB may also have the same identifier "Employee#5" in their respective namespace. As each company has its own namespace, the same identifier may be used by multiple companies without a conflict. Each tenant may then only know about the identifiers in its own namespace.

Figure 2:
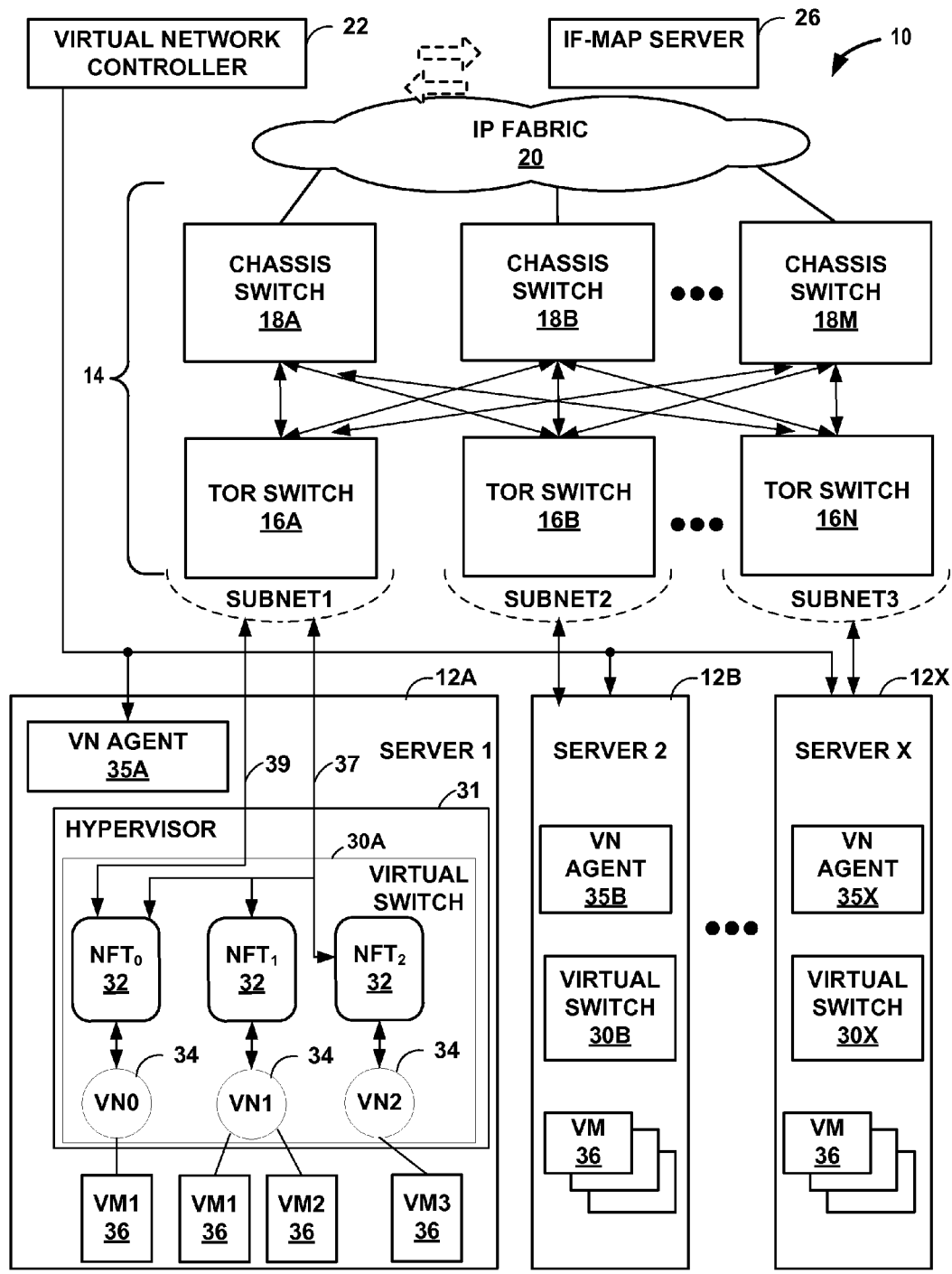
FIG. 2 is a block diagram illustrating in further detail an example system in which the techniques described herein may be implemented.

FIG. 2 is a block diagram illustrating an example implementation of data center 10 of FIG. 1 in further detail. In the example of FIG. 2, data center 10 includes an overlay network that extends switch fabric 14 from physical switches 16, 18 to software switches 32A-32X (also referred to as a "virtual switches). Software switches 32 dynamically create and manage or otherwise support one or more virtual networks 34 to be used by applications communicating with application instances. In one example, software switches 32 execute virtual networks 34 as an overlay network, which provides the capability to decouple an application's virtual address from a physical address (e.g., IP address) of the one of servers 12A-12X ("servers 12") on which the application is executing. Each of virtual networks 34 may utilize its own addressing and security scheme and may be viewed as orthogonal from the physical network and its addressing scheme. Various techniques may be utilized to transport packets within and across virtual network(s) 34 over the physical network.

Each virtual switch 30 may execute within a hypervisor, a host operating system or other component of each of servers 12. In the example of FIG. 2, virtual switch 30 executes within hypervisor 31, also often referred to as a virtual machine manager (VMM), which provides a virtualization platform that allows multiple operating systems to concurrently run on a corresponding one of host servers 12. In the example, of FIG. 2, virtual switch 30A manages or otherwise supports execution of virtual networks 34, each of which provides a network environment for execution of one or more virtual machines (VMs) 36 on top of the virtualization platform provided by hypervisor 31. Each VM 36 is associated with one of the virtual subnets VN0-VN2 managed by the hypervisor 31.

In general, each VM 36 may be any type of software application and may be assigned a virtual address for use within a corresponding virtual network 34, where each of the virtual networks may be a different virtual subnet provided by virtual switch 30A. A VM 36 may be assigned its own virtual layer three (L3) IP address, for example, for sending and receiving communications but may be unaware of an IP address of the server 12A on which the virtual machine is executing. In this way, a "virtual address" is an address for an application that differs from the logical address for the underlying, physical computer system, i.e., switch 12A in the example of FIG. 2.

In one implementation, each of servers 12 includes a virtual network agent ("VN agent") 35A-35X ("VN agents 35") that controls the overlay of virtual networks 34 and that coordinates the routing of data packets within server 12. In general, VN agent 35 communicates with virtual network controller 22, which generates commands to control routing of packets through data center 10. VN agent 35 may operate as a proxy for control plane messages between virtual machines 36 and virtual network controller 22. For example, a VM 36 may request to send a message using its virtual address via the VN agent 35, and VN agent 35 may in turn send the message and request that a response to the message be received for the virtual address of the VM 36 that originated the first message. In some cases, a VM 36 may invoke a procedure or function call presented by an application programming interface of VN agent 35, and the VN agent 35 may handle encapsulation of the message as well, including addressing.

In one example, network packets, e.g., layer three (L3) IP packets or layer two (L2) Ethernet packets generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet." Encapsulation and/or de-capsulation of virtual network packets within physical network packets may be performed within virtual switches 30, e.g., within the hypervisor or the host operating system running on each of servers 12. As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center to create one or more overlay networks. Other example tunneling protocols may be used, including IP over GRE, VxLAN, MPLS over GRE, etc.

As noted above, virtual network controller 22 provides a logically centralized controller for facilitating operation of one or more virtual networks within data center 10. Virtual network controller 22 may, for example, maintain a routing information base, e.g., on or more routing tables that store routing information for the physical network as well as the overlay network of data center 10. Similarly, switches 16, 18 and virtual switches 30 maintain routing information, such as one or more routing and/or forwarding tables. In one example implementation, virtual switch 30A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with one or more outer IP addresses.

The routing information may, for example, map packet key information (e.g., destination IP information and other select information from packet headers) to one or more specific next hops within the networks provided by virtual switches 30 and switch fabric 14. In some case, the next hops may be chained next hop that specify a set of operations to be performed on each packet when forwarding the packet, such as may be used for flooding next hops and multicasting replication. In some cases, virtual network controller 22 maintains the routing information in the form of a radix tree having leaf nodes that represent destinations within the network. U.S. Pat. No. 7,184,437 provides details on an exemplary embodiment of a router that utilizes a radix tree for route resolution, the contents of which is incorporated herein by reference in its entirety.

As shown in FIG. 2, each virtual network 34 provides a communication framework for encapsulated packet communications 37 for the overlay network established through switch fabric 14. In this way, network packets associated with any of virtual machines 36 may be transported as encapsulated packet communications 37 via the overlay network. In addition, in the example of FIG. 2, each virtual switch 30 includes a default network forwarding table $NFT_0$ and provides a default route that allows packet to be forwarded to virtual subnet VN0 without encapsulation, i.e., non-encapsulated packet communications 39 per the routing rules of the physical network of data center 10. In this way, subnet VN0 and virtual default network forwarding table $NFT_0$ provide a mechanism for bypassing the overlay network and sending non-encapsulated packet communications 39 to switch fabric 14.

Moreover, virtual network controller 22 and virtual switches 30 may communicate using virtual subnet VN0 in accordance with default network forwarding table $NFT_0$ during discovery and initialization of the overlay network, and during conditions where a failed link has temporarily halted communication via the overlay network. Once connectivity with the virtual network controller 22 is established, the virtual network controller 22 updates its local routing table to take into account new information about any failed links and directs virtual switches 30 to update their local network forwarding tables 32. For example, virtual network controller 22 may output commands to virtual network agents 35 to update one or more NFTs 32 to direct virtual switches 30 to change the tunneling encapsulation so as to re-route communications within the overlay network, for example to avoid a failed link.

When link failure is detected, a virtual network agent 35 local to the failed link (e.g., VN Agent 35A) may immediately change the encapsulation of network packet to redirect traffic within the overlay network and notifies virtual network controller 22 of the routing change. In turn, virtual network controller 22 updates its routing information any may issues messages to other virtual network agents 35 to update local routing information stored by the virtual network agents within network forwarding tables 32.

As further shown in the example of FIG. 2, multiple servers 12 have access to the IF-MAP server 26 via virtual network controller 22. Also, multiple tenants have access to the same IF-MAP server 26. Each server 12 has multiple tenants VN1, VN2, VN3 and a Translator (in the form of VN0) that knows all the tenants managed by its server 12. Upon receiving a query (which may be another way of referring to the requests referenced above) from a subnet, such as VN1, that belongs to CompanyA, the translator VN0 converts the query into a globally unique query by adding the unique namespace of the querying tenant (in this case, CompanyA).

For example, suppose a query is generated by CompanyA about Employee#5. Without the Translator VN0, a query about Employee#5 may not be processed because CompanyB and Company C may also have an identifier Employee#5 in their respective namespaces and the IF-MAP server 26 would not know to which Employee#5 the query pertains. The Translator VN0 translates the query "Employee#5" into "CompanyA: Employee#5" by identifying the connection through which the query came in (i.e., whether it came from VN1, VN2, etc., in the example of FIG. 2). With the translated query that is globally unique, the techniques may promote for efficient use of IF-MAP server 26 (in that IF-MAP server 26 may be shared by multiple tenants).

The query result (which is another way of referring to the response referenced above) generated by IF-MAP server 26 may include the namespace "CompanyA." If needed, the translator VN0 may strip the namespace from the globally unique identifier (and thereby recover the locally unique identifier) before forwarding the result to the subnet VN1 (which is the subnet that originated the request/query) because the subnet VN1 may not recognize the result that includes the namespace "CompanyA."

While the tenants are not "virtualization aware" or, in other words, aware of the multi-tenancy of data center 10, IF-MAP server 26 is virtualization-aware, and may use a format such as "namespace:identifier" when associating the session data for a particular identifier to the namespace:identifier in the database.

In this sense, VN0, which may represent the translator of virtual switch 30A (as one example, may receive a request regarding data associated with an identifier that is unique within one of the VNs 34 that originated the request. VN0 may then translate the identifier included within the request to generate a globally unique identifier that is unique within the VNs 34. VN0 may also update the request to replace the identifier included within the request with the globally unique identifier and transmit the updated request to IF-MAP server 26 via virtual network controller 22.

In some instances, as noted above, VN0 may perform the translation by appending a namespace assigned to the one of the virtual networks that originated the request, i.e., VN1 in the example above, to the identifier to generate the globally unique identifier.

As described above, the techniques may promote more efficient usage of IF-MAP server 26 by facilitating multi-tenancy. As a result of performing the techniques, VN0 may receive another request from a different one of VNs 34 than the one that originated what may be referred to as the first request described above (i.e., VN1 in the above example), where this second request may concern data associated with the same identifier as that included in the first request. This same identifier may also be unique within this other one of VNs 34, e.g., VN2. VN0 may then translate the identifier included within the second request to generate a second globally unique identifier that is unique within VNs 34 and different from the other globally unique identifier generated for the first request. VN0 may update this second request to replace the second identifier included within the second request with the second globally unique identifier, and transmit the updated second request to IF-MAP server 26. In this manner, the techniques may promote multi-tenancy within IF-MAP server 26 without having to virtualize or otherwise create and maintain multiple instances of an IF-MAP server 26 (such as one per customer or tenant).

Figure 3:
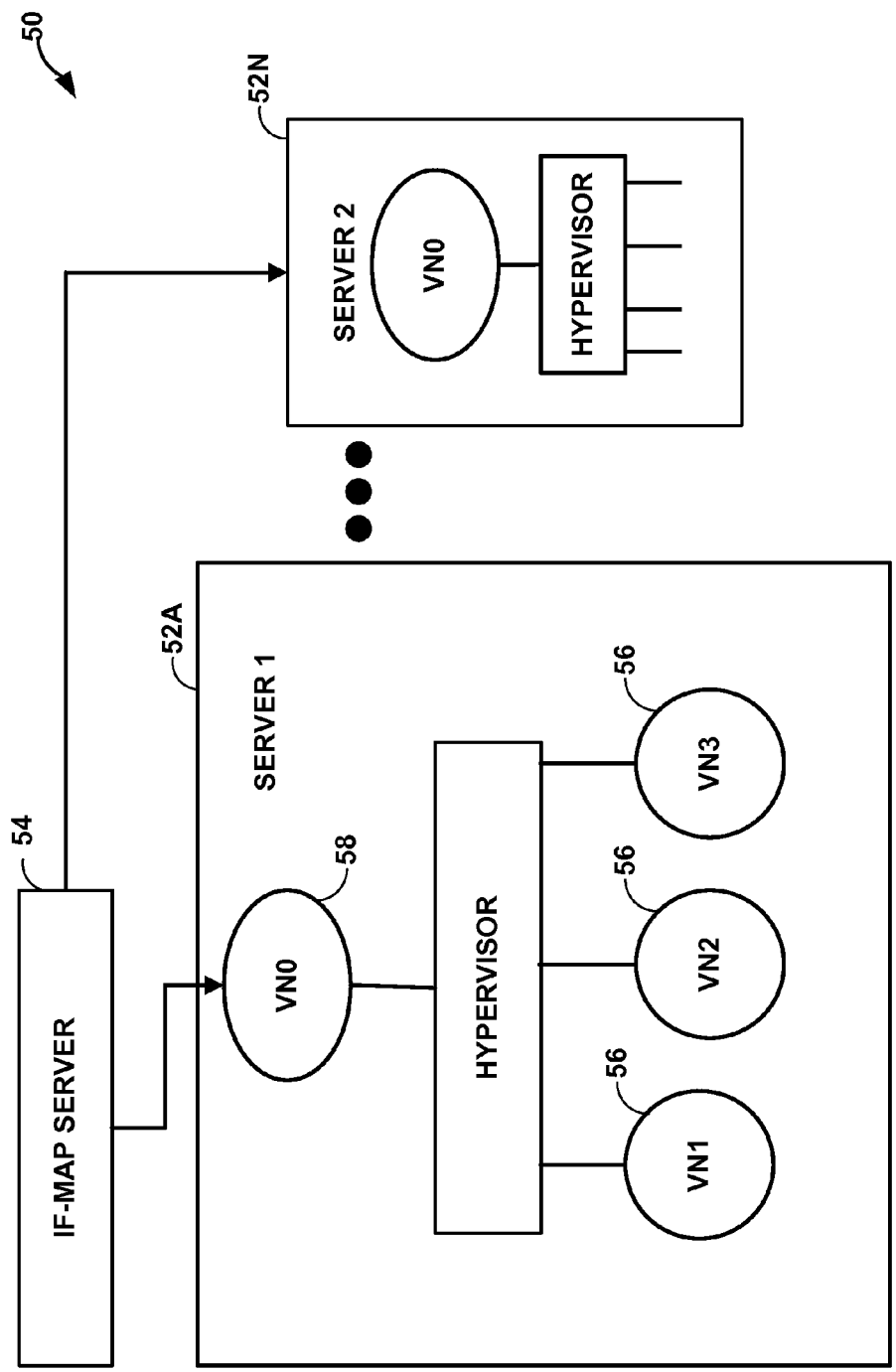
FIG. 3 is another block diagram illustrating a system that stores session information in accordance with various aspects of the techniques described in this disclosure.

FIG. 3 is another block diagram illustrating a system 50 that stores session information in accordance with various aspects of the techniques described in this disclosure. Multiple servers 52A-52N ("servers 52") have access to IF-MAP server 54. Servers 52 may each represent one of servers 12 shown in the examples of FIGS. 1 and 2. IF-MAP server 54 may represent IF-MAP server 26 in some examples. As described above, IF-MAP server 54 is virtualization-aware, and may use a format such as "namespace:identifier." Also, multiple tenants have access to IF-MAP server 26. Each of servers 52 has multiple tenants VN1, VN2, VN3 (which may be referred to collectively as "VNs 56") and a translator VN0 (which may also be referred to as translator 58") that includes data defining all the tenants managed by its corresponding one of servers 52.

Upon receiving a query from a subnet VN1 that belongs to, for example, CompanyA, the translator VN0 converts the query into a globally unique query by adding the unique namespace of the querying tenant (in this case, CompanyA). For example, suppose a query is generated by Company A about Employee#5. Without the translator VN0, a query regarding Employee#5 may not be processed because CompanyB and CompanyC may also have an identifier Employee#5 in their respective namespaces and IF-MAP server 54 would not know to which Employee#5 the query pertains. The translator VN0 translates the query "Employee#5" into "CompanyA: Employee#5" by identifying the connection through which the query came in. With the translated query that is globally unique, IF-MAP server 52 can be used efficiently given that multiple tenants may "share" the same IF-MAP server, i.e., IF-MAP server 54 in the example of FIG. 3.

The query result generated by IF-MAP server 54 may include the namespace "CompanyA." The translator VN0 may strip the namespace before forwarding the result to the subnet VN1 because the subnet VN1 may not recognize the result that includes the namespace "CompanyA."

Typically, VNs 56 forward all packets that are directed to resources internal to data center 10 to VN 58, which represents the VN for data center 10. In other words, when configuring VNs 56, each of VNs 56 are configured to forward requests for resources internal to data center 10, such as IF-MAP server 54, to VN 58. VN 58 may then process these requests, which in the case of IF-MAP server 54 may include translating this identifier (which is layer seven (L7) data in terms of the Open Systems Interconnection (OSI) model) and modifying the request to replace this identifier with the globally unique identifier.

Although not shown in the example of FIG. 3, VN 58 may also include a table or other data structure that identifies which of VNs 56 have been configured to use a namespace so as to automatically generate globally unique identifiers and which of VNs 56 have not been configured to use a namespace so as to automatically generation globally unique identifiers. That is, some of VNs 56 may be configured to use a namespace when formatting requests for session data associated with a particular identifier, while others of VNs 56 may not be configured to use a namespace in this manner. For those of VNs 56 not configured to use a namespace, translator 58 may transparently translate the identifier in these requests to generate an updated request having the globally unique identifier in place of the identifier generated by those of VNs 56 that do not use namespaces. VN 58 may maintain a data structure to identify those of VNs 56 that use namespaces and those that do not use namespaces, using this table to process both requests sent to and responses from IF-MAP server 54.

Figure 4:
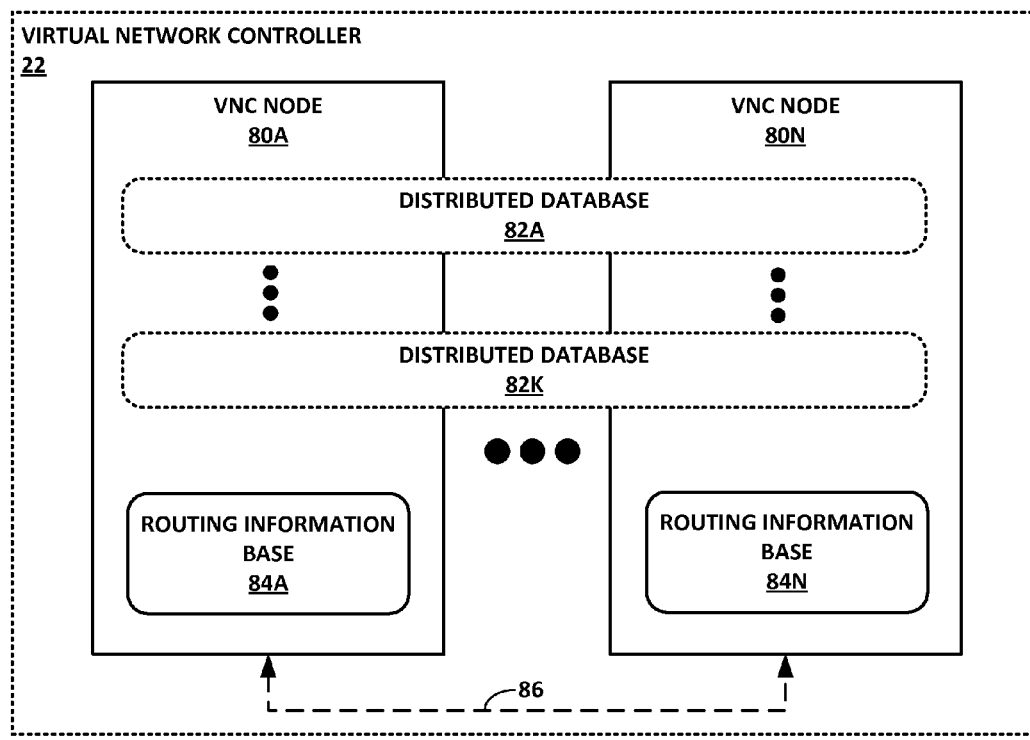
FIG. 4 is a block diagram illustrating an example implementation of a virtual network controller for facilitating operation of one or more virtual networks in accordance with one or more embodiments of this disclosure.

FIG. 4 is a block diagram illustrating an example implementation of a virtual network controller 22 for facilitating operation of one or more virtual networks in accordance with one or more embodiments of this disclosure. Virtual network controller 22 may, for example, correspond to virtual network controller 22 of data center 10 of FIGS. 1 and 2.

Virtual network controller (VNC) 22 of FIG. 4 illustrates a distributed implementation of a VNC that includes multiple VNC nodes 80A-80N (collectively, "VNC nodes 80") to execute the functionality of a data center VNC, including managing the operation of virtual switches for one or more virtual networks implemented within the data center. Each of VNC nodes 80 may represent a different server of the data center, e.g., any of servers 12 of FIGS. 1-2, or alternatively, on a server or controller coupled to the IP fabric by, e.g., an edge router of a service provider network or a customer edge device of the data center network. In some instances, some of VNC nodes 80 may execute as separate virtual machines on the same server.

Each of VNC nodes 80 may control a different, non-overlapping set of data center elements, such as servers, individual virtual switches executing within servers, individual interfaces associated with virtual switches, chassis switches, TOR switches, and/or communication links. VNC nodes 80 peer with one another using peering links 86 to exchange information for distributed databases, including distributed databases 82A-82K (collectively, "distributed databases 82"), and routing information (e.g., routes) for routing information bases 84A-84N (collectively, "RIBs 84"). Peering links 86 may represent peering links for a routing protocol, such as a Border Gateway Protocol (BGP) implementation, or another peering protocol by which VNC nodes 80 may coordinate to share information according to a peering relationship.

VNC nodes 80 of VNC 22 include respective RIBs 84 each having, e.g., one or more routing tables that store routing information for the physical network and/or one or more overlay networks of the data center controlled by VNC 22. In some instances, one of RIBs 84, e.g., RIB 84A, may store the complete routing table for any of the virtual networks operating within the data center and controlled by the corresponding VNC node 80 (e.g., VNC node 80A).

In general, distributed databases 82 define the configuration or describe the operation of virtual networks by the data center controlled by distributed VNC 22. For instance, distributes databases 82 may include databases that describe a configuration of one or more virtual networks, the hardware/software configurations and capabilities of data center servers, performance or diagnostic information for one or more virtual networks and/or the underlying physical network, the topology of the underlying physical network including server/chassis switch/TOR switch interfaces and interconnecting links, and so on. Distributed databases 82 may each be implemented using, e.g., a distributed hash table (DHT) to provide a lookup service for key/value pairs of the distributed database stored by different VNC nodes 22.

Figure 5:
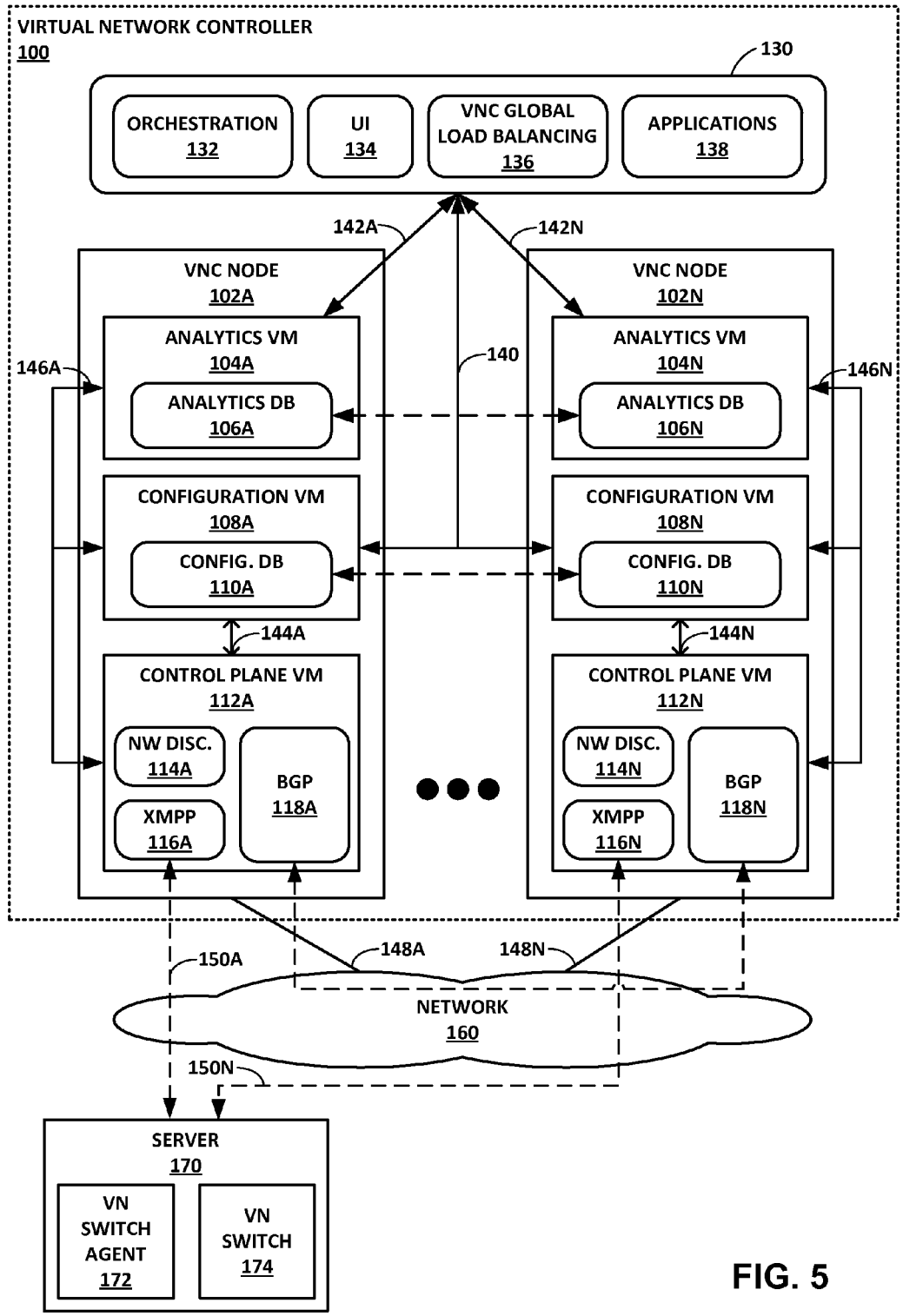
FIG. 5 is a block diagram illustrating an example implementation of a virtual network controller for facilitating operation of one or more virtual networks in accordance with one or more embodiments of this disclosure.

FIG. 5 is a block diagram illustrating an example implementation of a virtual network controller 100 for facilitating operation of one or more virtual networks in accordance with one or more embodiments of this disclosure. Virtual network controller 100 may, for example, correspond to virtual network controller 22 of data center 10 of FIGS. 1 and 2 or virtual network controller 22 of FIG. 4.

As illustrated in the example of FIG. 5, distributed virtual network controller (VNC) 100 includes one or more virtual network controller ("VNC") nodes 102A-102N (collectively, "VNC nodes 102"). Each of VNC nodes 102 may represent any of VNC nodes 80 of virtual network controller 22 of FIG. 4. VNC nodes 102 that peer with one another according to a peering protocol operating over network 160. Network 160 may represent an example instance of switch fabric 14 and/or IP fabric 20 of FIG. 1. In the illustrated example, VNC nodes 102 peer with one another using a Border Gateway Protocol (BGP) implementation, an example of a peering protocol. VNC nodes 102 provide, to one another using the peering protocol, information related to respective elements of the virtual network managed, at least in part, by the VNC nodes 102. For example, VNC node 102A may manage a first set of one or more servers operating as virtual network switches for the virtual network. VNC node 102A may send information relating to the management or operation of the first set of servers to VNC node 102N by BGP 118A. Other elements managed by VNC nodes 102 may include network controllers and/or appliances, network infrastructure devices (e.g., L2 or L3 switches), communication links, firewalls, and VNC nodes 102, for example. Because VNC nodes 102 have a peer relationship, rather than a master-slave relationship, information may be sufficiently easily shared between the VNC nodes 102. In addition, hardware and/or software of VNC nodes 102 may be sufficiently easily replaced, providing satisfactory resource fungibility.

Each of VNC nodes 102 may include substantially similar components for performing substantially similar functionality, said functionality being described hereinafter primarily with respect to VNC node 102A. VNC node 102A may include an analytics database 106A for storing diagnostic information related to a first set of elements managed by VNC node 102A. VNC node 102A may share at least some diagnostic information related to one or more of the first set of elements managed by VNC node 102A and stored in analytics database 106, as well as to receive at least some diagnostic information related to any of the elements managed by others of VNC nodes 102. Analytics database 106A may represent a distributed hash table (DHT), for instance, or any suitable data structure for storing diagnostic information for network elements in a distributed manner in cooperation with others of VNC nodes 102. Analytics databases 106A-106N (collectively, "analytics databases 106") may represent, at least in part, one of distributed databases 82 of distributed virtual network controller 22 of FIG. 4.

VNC node 102A may include a configuration database 110A for storing configuration information related to a first set of elements managed by VNC node 102A. Control plane components of VNC node 102A may store configuration information to configuration database 110A using interface 144A, which may represent an Interface for Metadata Access Points (IF-MAP) protocol implementation. VNC node 102A may share at least some configuration information related to one or more of the first set of elements managed by VNC node 102A and stored in configuration database 110A, as well as to receive at least some configuration information related to any of the elements managed by others of VNC nodes 102. Configuration database 110A may represent a distributed hash table (DHT), for instance, or any suitable data structure for storing configuration information for network elements in a distributed manner in cooperation with others of VNC nodes 102. Configuration databases 110A-110N (collectively, "configuration databases 110") may represent, at least in part, one of distributed databases 82 of distributed virtual network controller 22 of FIG. 4.

Virtual network controller 100 may perform any one or more of the illustrated virtual network controller operations represented by modules 130, which may include orchestration 132, user interface 134, VNC global load balancing 136, and one or more applications 138. VNC 100 executes orchestration module 132 to facilitate the operation of one or more virtual networks in response to a dynamic demand environment by, e.g., spawning/removing virtual machines in data center servers, adjusting computing capabilities, allocating network storage resources, and modifying a virtual topology connecting virtual switches of a virtual network. VNC global load balancing 136 executed by VNC 100 supports load balancing of analytics, configuration, communication tasks, e.g., among VNC nodes 102. Applications 138 may represent one or more network applications executed by VNC nodes 102 to, e.g., change topology of physical and/or virtual networks, add services, or affect packet forwarding.

User interface 134 includes an interface usable to an administrator (or software agent) to control the operation of VNC nodes 102. For instance, user interface 134 may include methods by which an administrator may modify, e.g. configuration database 110A of VNC node 102A. Administration of the one or more virtual networks operated by VNC 100 may proceed by uniform user interface 134 that provides a single point of administration, which may reduce an administration cost of the one or more virtual networks.

VNC node 102A may include a control plane virtual machine (VM) 112A that executes control plane protocols to facilitate the distributed VNC techniques described herein. Control plane VM 112A may in some instances represent a native process. In the illustrated example, control VM 112A executes BGP 118A to provide information related to the first set of elements managed by VNC node 102A to, e.g., control plane virtual machine 112N of VNC node 102N. Control plane VM 112A may use an open standards based protocol (e.g., BGP based L3VPN) to distribute information about its virtual network(s) with other control plane instances and/or other third party networking equipment(s). Given the peering based model according to one or more aspects described herein, different control plane instances (e.g., different instances of control plane VMs 112A-112N) may execute different software versions. In one or more aspects, e.g., control plane VM 112A may include a type of software of a particular version, and the control plane VM 112N may include a different version of the same type of software. The peering configuration of the control node devices may enable use of different software versions for the control plane VMs 112A-112N. The execution of multiple control plane VMs by respective VNC nodes 102 may prevent the emergence of a single point of failure.

Control plane VM 112A communicates with virtual network switches, e.g., illustrated VM switch 174 executed by server 140, using a communication protocol operating over network 160. Virtual network switches facilitate overlay networks in the one or more virtual networks. In the illustrated example, control plane VM 112A uses Extensible Messaging and Presence Protocol (XMPP) 116A to communicate with at least virtual network switch 174 by XMPP interface 150A. Virtual network route data, statistics collection, logs, and configuration information may in accordance with XMPP 116A be sent as XML documents for communication between control plane VM 112A and the virtual network switches. Control plane VM 112A may in turn route data to other XMPP servers (such as an analytics collector) or may retrieve configuration information on behalf of one or more virtual network switches. Control plane VM 112A may further execute a communication interface 144A for communicating with configuration virtual machine (VM) 108A associated with configuration database 110A. Communication interface 144A may represent an IF-MAP interface.

VNC node 102A may further include configuration VM 108A to store configuration information for the first set of element to and manage configuration database 110A. Configuration VM 108A, although described as a virtual machine, may in some aspects represent a native process executing on an operating system of VNC node 102A. Configuration VM 108A and control plane VM 112A may communicate using IF-MAP by communication interface 144A and using XMPP by communication interface 146A. In some aspects, configuration VM 108A may include a horizontally scalable multi-tenant IF-MAP server and a distributed hash table (DHT)-based IF-MAP database that represents configuration database 110A. In some aspects, configuration VM 108A may include a configuration translator, which may translate a user friendly higher-level virtual network configuration to a standards based protocol configuration (e.g., a BGP L3VPN configuration), which may be stored using configuration database 110A. Communication interface 140 may include an IF-MAP interface for communicating with other network elements. The use of the IF-MAP may make the storage and management of virtual network configurations very flexible and extensible given that the IF-MAP schema can be dynamically updated. In some instances, aspects of virtual network controller 100 may be flexible for new applications 138.

VNC node 102A may further include an analytics virtual machine (VM) 104A to store diagnostic information (and/or visibility information) related to at least the first set of elements managed by VNC node 102A. Control plane VM and analytics VM 104 may communicate using an XMPP implementation by communication interface 146A. Analytics VM 104A, although described as a virtual machine, may in some aspects represent a native process executing on an operating system of VNC node 102A.

Analytics VM 104A may include analytics database 106A, which may represent an instance of a distributed database that stores visibility data for virtual networks, such as one of distributed database 82 of distributed virtual network controller 22 of FIG. 4. Visibility information may describe visibility of both distributed VNC 100 itself and of customer networks. The distributed database may include an XMPP interface on a first side and a REST/JASON/XMPP interface on a second side.

Virtual network switch 174 may implement the layer 3 forwarding and policy enforcement point for one or more end points and/or one or more hosts. The one or more end points or one and/or one or more hosts may be classified into a virtual network due to configuration from control plane VM 112A. Control plane VM 112A may also distribute virtual-to-physical mapping for each end point to all other end points as routes. These routes may give the next hop mapping virtual IP to physical IP and encapsulation technique used (e.g., one of IPinIP, NVGRE, VXLAN, etc.). Virtual network switch 174 may be agnostic to actual tunneling encapsulation used. Virtual network switch 174 may also trap interesting layer 2 (L2) packets, broadcast packets, and/or implement proxy for the packets, e.g. using one of Address Resolution Protocol (ARP), Dynamic Host Configuration Protocol (DHCP), Domain Name Service (DNS), etc.

In some cases, different VNC nodes 102 may be provided by different suppliers. However, the peering configuration of VNC nodes 102 may enable use of different hardware and/or software provided by different suppliers for implementing the VNC nodes 102 of distributed VNC 100. A system operating according to the techniques described above may provide logical view of network topology to end-host irrespective of physical network topology, access type, and/or location. Distributed VNC 100 provides programmatic ways for network operators and/or applications to change topology, to affect packet forwarding, and/or to add services, as well as horizontal scaling of network services, e.g. firewall, without changing the end-host view of the network.

In accordance with various aspects of the techniques described in this disclosure, the translator of one or more of configuration VMs 108 may provide translation to facilitate multi-tenancy within the IF-MAP server/database. That is, these translators discussed above may perform the techniques described in this disclosure to translate identifiers unique to the originating one of configuration VMs 108, but not unique globally across all of configuration VMs 108, to globally unique identifiers to facilitate multi-tenancy within the IF-MAP server/database in the manner described above. These translators may perform translation that is similar, in this respect, to the translation performed by VN 58, as described above with respect to the example of FIG. 3.

Figure 6:
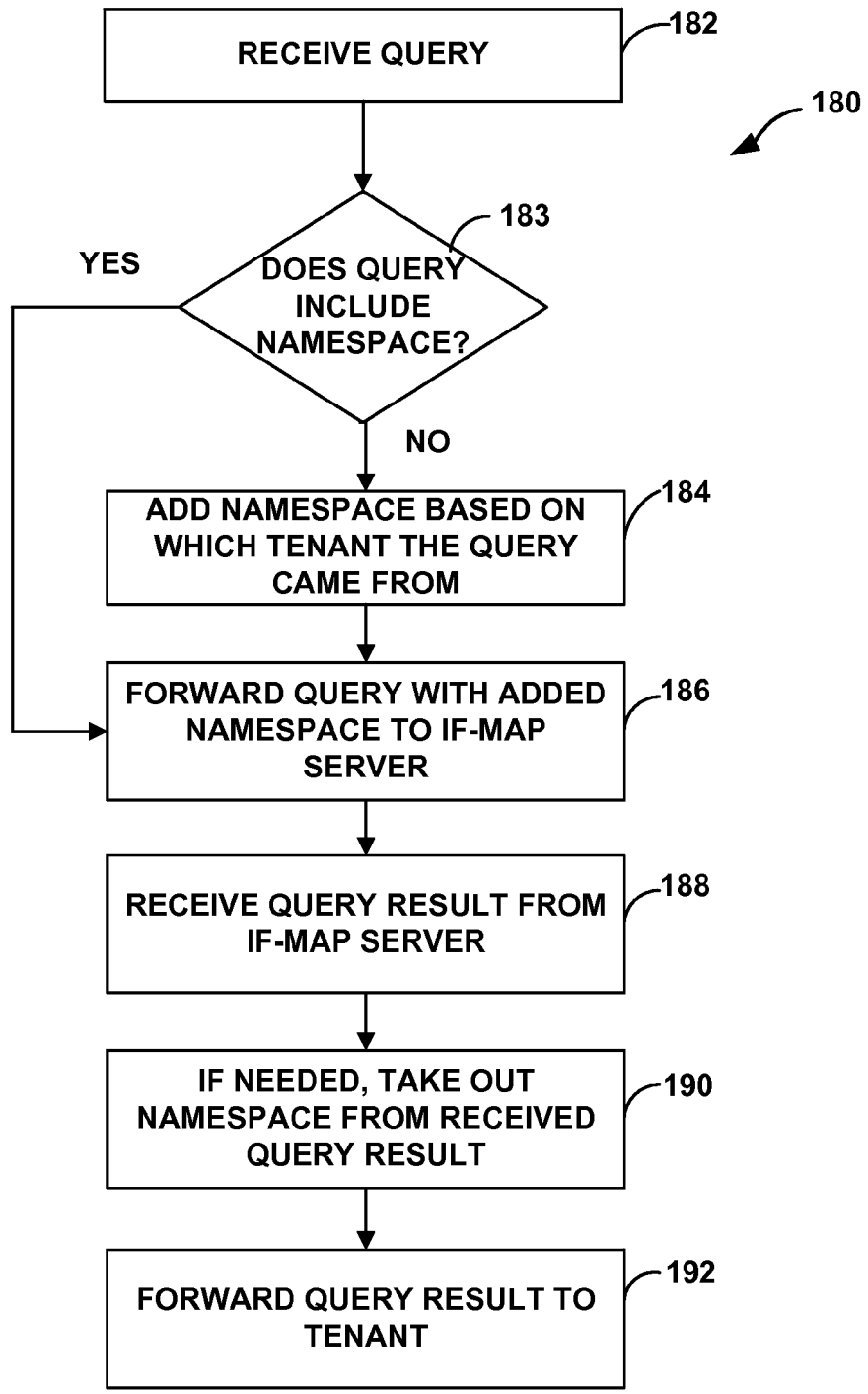
FIG. 6 is a is a flowchart depicting operation of a virtual switch executed by server a server in performing the query translation process according to various aspects of the techniques described in this disclosure.

FIG. 6 is a is a flowchart depicting operation of a virtual switch executed by a server in performing the query translation process according to various aspects of the techniques described in this disclosure. Typically, the query translation process (denoted as query translation process "180" in the example of FIG. 6) would be executed in server 12A, for example, by the translator VN0 (or in server 52A, for example, by VN 58). In some instances, one or more of configuration VMs 108 may execute query translation process 150.

The translator VN0 receives a query (e.g., for data associated with the identifier "Employee#5") from one of the tenants (step 182), such as CompanyA that is hosted by subnet VN1. If the query does not include a namespace (step 183), the translator VN0 globalizes the query by adding a namespace to it based on from which tenant the query came (step 184). If the query already includes a namespace, then no namespace is added and step 154 may be bypassed. The query with the added namespace may now be "CompanyA: Employee#5." This query with the added namespace is then forwarded to IF-MAP server 26 (step 186), and a result is received (step 188). The result includes the namespace "CompanyA," as the IF-MAP server 26 is universal and handles queries from different subnets 218. For example, the result may be "CompanyA:Miami." If the original query did not include a namespace, the translator VN0 takes out the namespace (step 190) and forwards the result ("Miami") to the tenant (step 192). If the original query included a namespace, the Translator VN0 may forward the query result to the tenant without taking out the namespace.

With the query translation process 180, server 12A may automatically add the namespace to an identifier without the client or tenant being aware of the naming scheme. Server 12A may, in this sense, effectively translate between a locally unique identifier and a globally unique identifier, allowing multiple tenants to share the IF-MAP server 26.

Figure 7:
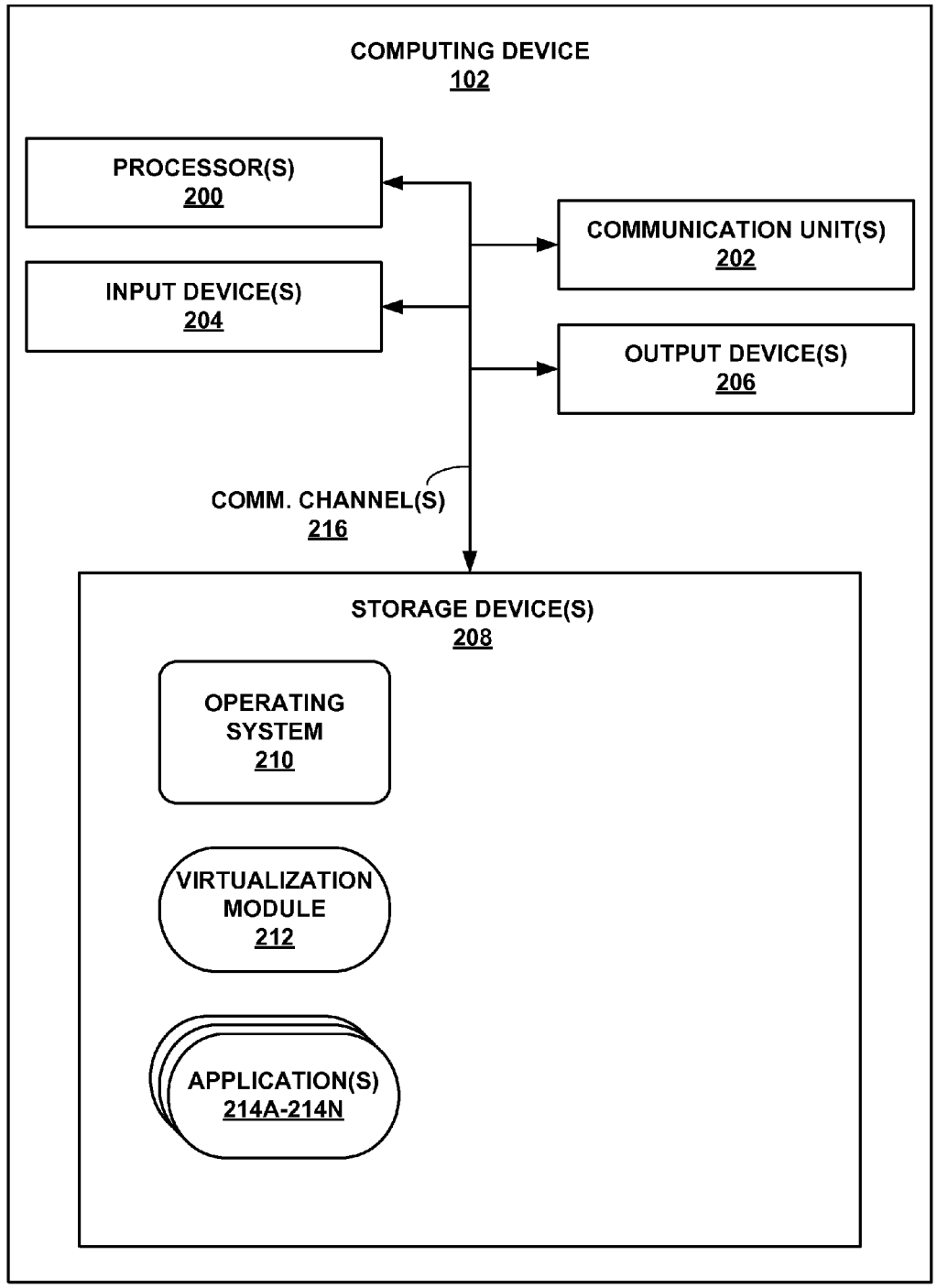
FIG. 7 is a block diagram illustrating an example device that may perform the query translation techniques in accordance with one or more aspects of the present disclosure.

FIG. 7 is a block diagram illustrating an example device 102 that may perform the query translation techniques in accordance with one or more aspects of the present disclosure. FIG. 7 illustrates only one particular example of computing device 102, and many other examples of computing device 102 may be used in other instances.

As shown in the specific example of FIG. 7, computing device 102 includes one or more processors 200, one or more communication units 202, one or more input devices 204, one or more output devices 206, and one or more storage devices 208. Computing device 102, in the specific example of FIG. 7, further includes operating system 210, virtualization module 212, and one or more applications 214A-214N (collectively "applications 214"). Each of components 200, 202, 204, 206, and 208 may be interconnected (physically, communicatively, and/or operatively) for inter-component communications. As one example in FIG. 7, components 200, 202, 204, 206, and 208 may be coupled by one or more communication channels 216. In some examples, communication channels 216 may include a system bus, network connection, interprocess communication data structure, or any other channel for communicating data. Virtualization module 212 and applications 214, as well as operating system 210 may also communicate information with one another as well as with other components in computing device 102.

Processors 200, in one example, are configured to implement functionality and/or process instructions for execution within computing device 102. For example, processors 200 may be capable of processing instructions stored in storage devices 208. Examples of processors 200 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 208 may be configured to store information within computing device 102 during operation. Storage devices 208, in some examples, are described as a computer-readable storage medium. In some examples, storage devices 208 are a temporary memory, meaning that a primary purpose of storage devices 208 is not long-term storage. Storage devices 208, in some examples, are described as a volatile memory, meaning that storage devices 208 do not maintain stored contents when the computer is turned off. Examples of volatile memories include random access memories (RAM), dynamic random access memories (DRAM), static random access memories (SRAM), and other forms of volatile memories known in the art. In some examples, storage devices 208 are used to store program instructions for execution by processors 200. Storage devices 208, in one example, are used by software or applications running on computing device 102 (e.g., operating system 210, virtualization module 212 and the like) to temporarily store information during program execution.

Storage devices 208, in some examples, also include one or more computer-readable storage media. Storage devices 208 may be configured to store larger amounts of information than volatile memory. Storage devices 208 may further be configured for long-term storage of information. In some examples, storage devices 208 include non-volatile storage elements. Examples of such non-volatile storage elements include magnetic hard discs, tape cartridges or cassettes, optical discs, floppy discs, flash memories, or forms of electrically programmable memories (EPROM) or electrically erasable and programmable memories (EEPROM).

Computing device 102, in some examples, also includes one or more communication units 202. Computing device 102, in one example, utilizes communication units 202 to communicate with external devices. Communication units 202 may communicate, in some examples, by sending data packets over one or more networks, such as one or more wireless networks, via inbound and outbound links. Communication units 202 may include one or more network interface cards (IFCs), such as an Ethernet card, an optical transceiver, a radio frequency transceiver, or any other type of device that can send and receive information. Other examples of such network interfaces may include Bluetooth, 3G and WiFi radio components.

Computing device 102, in one example, also includes one or more input devices 204. Input devices 204, in some examples, are configured to receive input from a user through tactile, audio, or video feedback. Examples of input devices 204 include a presence-sensitive display, a mouse, a keyboard, a voice responsive system, video camera, microphone or any other type of device for detecting a command from a user. In some examples, a presence-sensitive display includes a touch-sensitive screen.

One or more output devices 206 may also be included in computing device 102. Output devices 206, in some examples, are configured to provide output to a user using tactile, audio, or video stimuli. Output devices 206, in one example, include a presence-sensitive display, a sound card, a video graphics adapter card, or any other type of device for converting a signal into an appropriate form understandable to humans or machines. Additional examples of output devices 206 include a speaker, a cathode ray tube (CRT) monitor, a liquid crystal display (LCD), or any other type of device that can generate output to a user.

Computing device 102 may include operating system 210. Operating system 210, in some examples, controls the operation of components of computing device 102. For example, operating system 210 facilitates the communication of modules applications 214 with processors 200, communication units 202, input devices 204, output devices 206, and storage devices 210. Virtualization module 212 may represent a hypervisor, such as hypervisor 31 of FIG. 2, or other module that provides the virtual environment in which the virtual switch (such as virtual switches 30) may execute. Applications 214 may each include program instructions and/or data that are executable by computing device 102. As one example, application 214A may include instructions that cause computing device 102 to perform one or more of the operations and actions described in the present disclosure.

In accordance with techniques of the present disclosure, virtualization module 212 of computing device 102 may receive a request regarding data associated with an identifier that is unique within one of the plurality of virtual networks that originated the request. Virtualization module 212 may, as described above, translate the identifier included within the request to generate a globally unique identifier that is unique within the plurality of virtual networks. Virtualization module 212 may, as described above, update the request to replace the identifier included within the request with the globally unique identifier, and transmit the updated request to an IF-MAP server, such as IF-MAP server 26.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable storage media. In some examples, an article of manufacture may include one or more computer-readable storage media.

A computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method comprising:
receiving, with a virtual switch that supports a plurality of virtual networks executing within a data center, a request regarding data associated with an identifier that is unique within one of the plurality of virtual networks that originated the request;
translating the identifier included within the request to generate a globally unique identifier that is unique within the plurality of virtual networks;
updating the request to replace the identifier included within the request with the globally unique identifier; and
transmitting the updated request to a server of the data center.

2. The method of claim 1, wherein translating the identifier included within the request comprises appending a namespace assigned to the one of the virtual networks that originated the request to the identifier to generate the globally unique identifier.

3. The method of claim 1,
wherein the one of the plurality of virtual network that originated the request comprises a first one of the plurality of virtual networks,
wherein the request comprises a first request,
wherein the globally unique identifier comprises a first globally unique identifier, and
wherein the method further comprises:
receiving, with the virtual switch, a second request regarding data associated with the same identifier as that included in the first request, wherein the same identifier is also unique within a second one of the plurality of virtual networks that originated the second request;
translating the identifier included within the second request to generate a second globally unique identifier that is unique within the plurality of virtual networks and different from the first globally unique identifier;
updating the second request to replace the second identifier included within the second request with the second globally unique identifier; and
transmitting the updated second request to the server.

4. The method of claim 1, further comprising:
receiving a response from the server that includes the globally unique identifier;
translating the globally unique identifier to recover the identifier included within the request;
updating the response to replace the globally unique identifier with the recovered identifier; and
transmitting the response to the one of the plurality of virtual networks that issued the request.

5. The method of claim 4,
wherein translating the request comprises transparently translating the identifier included within the request to generate the globally unique identifier that is unique within the plurality of virtual networks such that the one of the plurality of virtual networks that originated the response does not detect the translation, and
wherein translating the globally unique identifier comprises transparently translating the globally unique identifier included within the response to recover the identifier included within the request such that the one of the plurality of virtual networks that originated the response is not aware of the translation.

6. The method of claim 1, wherein translating the identifier comprises transparently translating the identifier included within the request to generate the globally unique identifier that is unique within the plurality of virtual networks such that the one of the plurality of virtual networks that originated the response is not aware of the translation.

7. The method of claim 1,
wherein the request conforms to a vendor neutral protocol, and
wherein the server comprises a vendor neutral server that stores data in accordance with a vendor neutral data model.

8. The method of claim 1,
wherein the request conforms to an Interface for Metadata Access Point (IF-MAP) protocol, and
wherein the server comprises an IF-MAP server that stores data in accordance with an IF-MAP data model.

9. The method of claim 1,
wherein each of the plurality of virtual networks is associated with a different customer of the data center, and
wherein the server comprises a multi-tenant server that stores data for at least two of the different customers.

10. A device included within a data center comprising:
one or more processors configured to execute a virtual switch that supports a plurality of virtual networks executing within the data center,
wherein the virtual switch is configured to receive a request regarding data associated with an identifier that is unique within one of the plurality of virtual networks that originated the request, translate the identifier included within the request to generate a globally unique identifier that is unique within the plurality of virtual networks, update the request to replace the identifier included within the request with the globally unique identifier, and transmit the updated request to a server of the data center.

11. The device of claim 10, wherein the one or more processors are further configured to, when translating the identifier included within the request, append a namespace assigned to the one of the virtual networks that originated the request to the identifier to generate the globally unique identifier.

12. The device of claim 10,
wherein the one of the plurality of virtual network that originated the request comprises a first one of the plurality of virtual networks,
wherein the request comprises a first request,
wherein the globally unique identifier comprises a first globally unique identifier, and
wherein the one or more processors are further configured to receive a second request regarding data associated with the same identifier as that included in the first request, wherein the same identifier is also unique within a second one of the plurality of virtual networks that originated the second request, translate the identifier included within the second request to generate a second globally unique identifier that is unique within the plurality of virtual networks and different from the first globally unique identifier, update the second request to replace the second identifier included within the second request with the second globally unique identifier, and transmit the updated second request to the server.

13. The device of claim 10, wherein the one or more processors are further configured to receive a response from the server that includes the globally unique identifier, translate the globally unique identifier to recover the identifier included within the request, update the response to replace the globally unique identifier with the recovered identifier, and transmit the response to the one of the plurality of virtual networks that issued the request.

14. The device of claim 13,
wherein the one or more processors are further configured to, when translating the request, transparently translate the identifier included within the request to generate the globally unique identifier that is unique within the plurality of virtual networks such that the one of the plurality of virtual networks that originated the response does not detect the translation, and
wherein the one or more processors are further configured to, when translating the globally unique identifier, transparently translate the globally unique identifier included within the response to recover the identifier included within the request such that the one of the plurality of virtual networks that originated the response is not aware of the translation.

15. The device of claim 10, wherein the one or more processors are further configured to, when translating the identifier, transparently translate the identifier included within the request to generate the globally unique identifier that is unique within the plurality of virtual networks such that the one of the plurality of virtual networks that originated the response is not aware of the translation.

16. The device of claim 10,
wherein the request conforms to a vendor neutral protocol, and
wherein the server comprises a vendor neutral server that stores data in accordance with a vendor neutral data model.

17. The device of claim 10,
wherein the request conforms to an Interface for Metadata Access Point (IF-MAP) protocol, and
wherein the server comprises an IF-MAP server that stores data in accordance with an IF-MAP data model.

18. The device of claim 10,
wherein each of the plurality of virtual networks is associated with a different customer of the data center, and
wherein the server comprises a multi-tenant server that stores data for at least two of the different customers.

19. A non-transitory computer readable storage medium having stored thereon instructions that, when executed, cause one or more processors of a device included within a data center to execute a virtual switch that supports a plurality of virtual networks executing within the data center, wherein the virtual switch is configured to receive a request regarding data associated with an identifier that is unique within one of the plurality of virtual networks that originated the request, translate the identifier included within the request to generate a globally unique identifier that is unique within the plurality of virtual networks, update the request to replace the identifier included within the request with the globally unique identifier, and transmit the updated request to a server.

20. The non-transitory computer-readable storage medium of claim 19, wherein the instructions that, when executed, cause the one or more processors to translating the identifier included within the request further comprise instructions that, when executed, cause the one or more processors to append a namespace assigned to the one of the virtual networks that originated the request to the identifier to generate the globally unique identifier.

* * * * *